(12) United States Patent
Janson et al.

(10) Patent No.: US 7,678,003 B2
(45) Date of Patent: Mar. 16, 2010

(54) HYBRID VEHICLE TRANSMISSION WITH A MECHANICAL REVERSE FUNCTION

(75) Inventors: David Janson, Plymouth, MI (US); Reid Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 490 days.

(21) Appl. No.: 11/625,012

(22) Filed: Jan. 19, 2007

(65) Prior Publication Data

US 2008/0176695 A1    Jul. 24, 2008

(51) Int. Cl.
 *F16H 3/72* (2006.01)
(52) U.S. Cl. .................... 475/5; 475/311; 475/314
(58) Field of Classification Search ............ 475/5, 475/149, 150, 311, 314
 See application file for complete search history.

(56) References Cited

U.S. PATENT DOCUMENTS

| | | | |
|---|---|---|---|
| 5,669,842 A * | 9/1997 | Schmidt | 475/5 |
| 5,775,449 A * | 7/1998 | Moroto et al. | 180/65.235 |
| RE38,017 E | 3/2003 | Yamaguchi et al. | |
| 6,654,672 B2 * | 11/2003 | Yamaguchi et al. | 701/22 |
| 6,835,157 B2 | 12/2004 | Haka | |
| 6,941,830 B2 | 9/2005 | Ibamoto et al. | |
| 6,991,053 B2 | 1/2006 | Kuang et al. | |
| 7,128,677 B2 | 10/2006 | Supina et al. | |
| 7,175,555 B2 * | 2/2007 | Kozarekar et al. | 475/5 |
| 7,455,610 B2 * | 11/2008 | Kim | 475/5 |
| 2004/0166980 A1 | 8/2004 | Supina et al. | |
| 2006/0019784 A1 | 1/2006 | Sowul et al. | |
| 2006/0046886 A1 | 3/2006 | Holmes et al. | |
| 2006/0148605 A1 | 7/2006 | Raghavan et al. | |

FOREIGN PATENT DOCUMENTS

| | | |
|---|---|---|
| EP | 1818236 A | 8/2007 |
| GB | 2358006 A | 7/2001 |
| GB | 2406318 A | 3/2005 |

OTHER PUBLICATIONS

Search Report under Section 17(5) for Application GB072584.4 dated Apr. 2, 2008.

* cited by examiner

*Primary Examiner*—Ha D. Ho
(74) *Attorney, Agent, or Firm*—David B. Kelley; Brooks Kushman P.C.

(57) ABSTRACT

A hybrid electric vehicle powertrain has an engine, a motor, a generator and a battery that define electro-mechanical power flow paths to vehicle traction wheels in both a forward drive operating mode and a reverse drive operating mode. The engine drives a power input element of a power-dividing gearset and the generator is connected to a reaction element of the power-dividing gearset. A torque reversing gearset drivably connects a power output element of the power-dividing gearset to final drive gearing to complement reverse driving motor torque.

14 Claims, 4 Drawing Sheets

1

HYBRID VEHICLE TRANSMISSION WITH A MECHANICAL REVERSE FUNCTION

BACKGROUND OF THE INVENTION

1. Field of the Invention

The invention relates to a powertrain for a hybrid electric vehicle with an electro-mechanical reverse drive power flow path.

2. Background Art

A known hybrid electric vehicle powertrain with a so-called divided power characteristic, sometimes referred to as a power split "HEV", comprises gearing, including a planetary gear unit, that establishes power flow paths from an internal combustion engine and an electric traction motor to vehicle traction wheels. An example of powertrains of this type are disclosed in U.S. Pat. No. 6,991,053, which is assigned to the assignee of the present invention, and U.S. Pat. RE38017.

The powertrains disclosed in these references include a planetary gear unit and an internal combustion engine connected directly to the carrier of the planetary gear unit. The sun gear of the planetary gear unit is drivably connected to a generator. A ring gear of the planetary gear unit acts as a power output member that delivers driving power to traction wheels through torque transfer gearing. A motor also delivers power to vehicle traction wheels through the transfer gearing. The generator and the motor, together with a high voltage battery, are electrically coupled.

The generator can be commanded to provide power assistance to the powertrain during launch of the vehicle. Electric power then is supplied to the battery, which in turn powers the motor.

During reverse drive, the motor may be operated in a reverse direction to provide a reverse torque to the vehicle traction wheels. During reverse drive, the generator is incapable of operating as a motor to provide power assistance since there is no reaction torque available to transmit generator torque to the ring gear, except for a small torque that may rotate the engine crankshaft.

Previous attempts have been made to enhance reverse drive performance by providing additional gearing in the torque flow path for the motor. An example of a powertrain of this type may be seen by referring to U.S. Pat. No. 7,128,677, which is assigned to the assignee of the present invention. A powertrain of that type would become much longer because of the space needed for the additional gearing that would be needed. It would not readily be capable of being packaged in a contemporary automotive vehicle environment. It is an objective of the present invention, therefore, to overcome shortcomings of known hybrid electric vehicle powertrains by providing an enhanced reverse driving torque function that will not require an increase in the length of the powertrain and that would be capable of being packaged in a conventional automotive vehicle environment while providing a mechanical reverse power flow path.

SUMMARY OF THE INVENTION

One embodiment of the invention comprises a powertrain with a power dividing planetary gear unit and an internal combustion engine on a common axis. A secondary gear unit may be situated on the common axis of the engine and the power dividing gearset. The secondary gearset is a torque reversing planetary gearset located between the power dividing gearset and the engine. A power output element of the torque reversing gearset is coupled to a torque transfer gear assembly that is in a torque flow path from the motor to the vehicle traction wheels. A gear element of the torque transfer gears is drivably coupled to final drive gearing that distributes torque to the vehicle traction wheels.

The torque reversing gearset includes a forward and reverse coupler clutch strategically located on the common axis for the power dividing gearset and the engine. Forward driving torque can be distributed to the final drive gearing to complement motor torque when the motor functions in a forward driving mode. The coupler clutch is conditioned to distribute reverse driving torque from the power dividing gearset to the torque transfer gear assembly to complement reverse driving torque of the motor when the powertrain is operating in a reverse driving mode.

DETAILED DESCRIPTION EMBODIMENTS OF THE INVENTION

Figure 1:
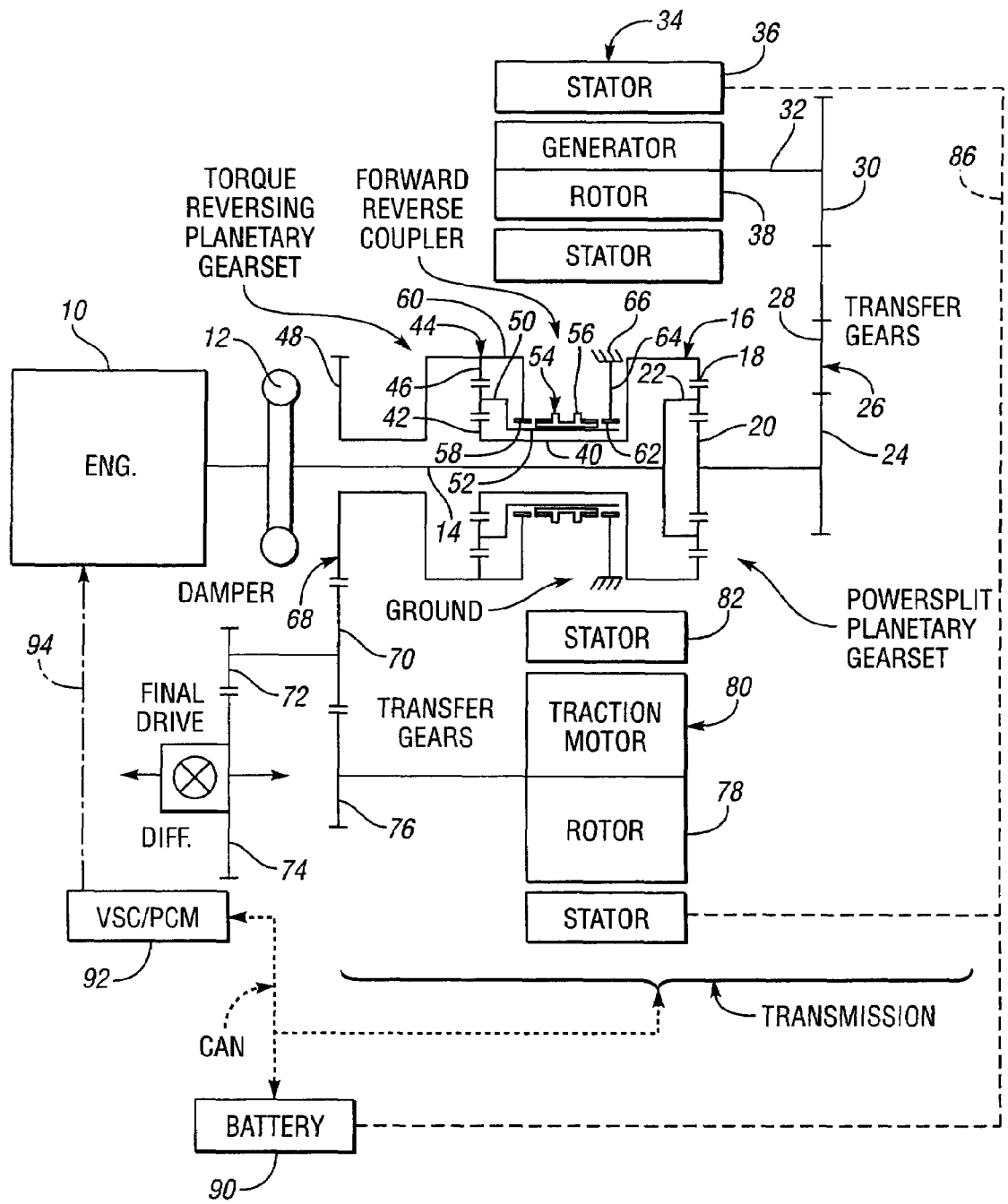
FIG. 1 shows in schematic form the elements of a first embodiment of the invention wherein a forward and reverse coupler clutch drivably connects two elements of torque reversing gearing when the powertrain is in a forward driving mode, and wherein reverse driving mode occurs when the coupler clutch grounds one element of the torque reversing gearing.

FIG. 1 shows schematically an engine at 10. The crankshaft of engine 10 is connected through a damper 12 to an intermediate shaft 14 for a pair of planetary gearsets. The first planetary gearset is a power dividing gearset, generally shown at 16. It includes a ring gear 18, a sun gear 20 and a carrier 22. The carrier is drivably connected to intermediate shaft 14. Gear element 24, which is connected to sun gear 20, engages gear element 28, which in turn engages gear element 30 located on an axis of shaft 32 for a generator shown at 34. The shaft 32 is parallel to the intermediate shaft 14.

The generator 34 includes a stator 36, which is fixed to the transmission housing. A generator rotor 38 is connected to shaft 32.

Carrier 22 rotatably supports planetary pinions that are in driving engagement with ring gear 18 and sun gear 20. Ring gear 18 is connected through sleeve shaft 40 to sun gear 42 of a torque reversing planetary gearset 44. Ring gear 46 of gearset 44 is drivably connected to transfer gear 48 through a sleeve shaft. Carrier 50 of torque reversing planetary gearset 44 supports planetary pinions engageable with ring gear 46 and sun gear 42. It is directly connected to sleeve shaft 52.

A forward and reverse coupler clutch assembly 54 includes shiftable clutch element 56, which can be moved in a left-hand direction or a right-hand direction along a central axis of intermediate shaft 14 to which it is splined. Clutch element 56 is a sleeve that has internal and external splines. The external splines of clutch element 56 engage internal clutch teeth 58, which are directly connected, as shown at 60, to ring gear 46.

Although the forward and reverse coupler clutch 54 as disclosed is a dog clutch, it could be of a different design, such as a synchronizer-type clutch of known design. Furthermore, external clutch teeth on sleeve 56 could be used instead of external clutch teeth and the internal clutch teeth 58 and 62 could be replaced by external clutch teeth.

The forward and reverse coupler clutch assembly 54 also includes internal clutch teeth 62, which are fixed or anchored to ground, as shown at 64, to the transmission housing schematically shown at 66.

When the sleeve 56 is shifted in a right-hand direction, the external teeth of the sleeve 56 drivably engage internal clutch teeth 62, which anchors shaft 52 and carrier 50.

Transfer gear 48 forms a part of a transfer gear assembly schematically shown at 68. Gear 48 engages gear element 70 of countershaft gearing that includes a gear element 72. A final drive power input gear 74 engages gear element 72. The final drive is connected through a differential assembly in the usual fashion to vehicle traction wheels. Transfer gear element 70 engages transfer gear 76, which is directly connected to the rotor 78 of a traction motor 80. The traction motor includes a stationary stator 82, which is connected to the transmission housing.

A high voltage battery indicated at 90 is electrically coupled to the generator and the motor by a high voltage bus 86. A control area network (CAN) connects the transmission to battery 90 and to a vehicle system controller and a powertrain control module, shown at 92. The transmission comprises the motor 80, the planetary gearsets 16 and 44 and the generator 34, as well as the transfer gearing. The vehicle system controller and powertrain control module deliver appropriate commands to the engine 10, as indicated at 94.

During operation of the powertrain schematically illustrated in FIG. 1, engine torque is delivered from engine 10 through damper 12 to intermediate shaft 14 and to the carrier 22 of the planetary gearset 16. The sun gear 20 of the gearset 16 transfers torque during a split power drive mode to generator rotor shaft 32 through transfer gears 24, 28 and 30. Electric energy is distributed from battery 90 to the stator 82 of the motor 80 during split power operating mode, and electric charging energy is distributed from generator 34 to the battery 90.

During operation in the split power mode, sun gear 20 provides reaction torque for the planetary gearset 16 as the generator 34 is driven. Ring gear 18 of planetary gearset 16 acts as a power output element for the planetary gearset 16. Ring gear torque is distributed to sun gear 42 of the torque reversing planetary gearset 44 through sleeve shaft 40 surrounding main shaft 14.

The carrier 50 of gearset 44, as previously indicated, is connected directly to sleeve shaft 52. The clutch sleeve 56 for coupler clutch assembly 54 is slidably engaged with sleeve shaft 52. Sleeve 56 has internal splines that slidably engage external splines on the sleeve shaft 52. When the sleeve 56 is shifted in the left-hand direction, external teeth on the sleeve 56 engage internal teeth of clutch element 58. Clutch element 58 is carried by element 60 of the torque reversing planetary gearset 44. Thus, the carrier 50 and the ring gear 46 of the gearset 44 become locked together, which provides a gearset ratio of unity. Ring gear torque at 18 then is directly transferred through sleeve shaft 40, through the locked-up gearset 44 and to transfer gear 48. Thus, the final drive differential gear 74 is driven by countershaft gear elements 70 and 72.

Simultaneously with this torque distribution through a mechanical torque flow path from the engine to the final drive differential gearing, motor torque from motor 80 is delivered to transfer gear 76. Motor torque then is combined with mechanical torque delivered from the engine as the motor 80 is driven in a forward driving direction.

When the sleeve 56 of the coupler clutch assembly 54 is shifted in a right-hand direction, the external teeth of the sleeve 56 engage internal teeth 62, which are grounded, as shown at 64 and 66. This will cause the carrier 50 of the forward and reverse coupler to be braked, thereby providing a torque reaction. As torque for ring gear 18 is delivered to sun gear 42, ring gear 46 is driven in a reverse direction. Reverse driving torque then is delivered to transfer gear 48 and to countershaft gear elements 70 and 72. This reverse driving torque is added to torque delivered from motor 80 to transfer gear 76, thereby providing increased reverse driving performance. The motor is commanded at this time by the vehicle system controller and powertrain control module 92 to transition from a forward driving mode to a reverse driving mode in response to operator inputs received by the vehicle system controller and the powertrain control module.

The torque reversing planetary gearset 44 is strategically positioned with respect to the generator 34, the motor 80, the planetary gearset 16 and the transfer gears so that the overall dimensions in the direction of the engine crankshaft axis and in a lateral direction perpendicular to the engine axis are not increased. The overall assembly of the powertrain thus can be packaged in a vehicle environment as readily as a powertrain of the type as shown, for example, in the previously mentioned '053 patent and the '017 patent.

Figure 2:
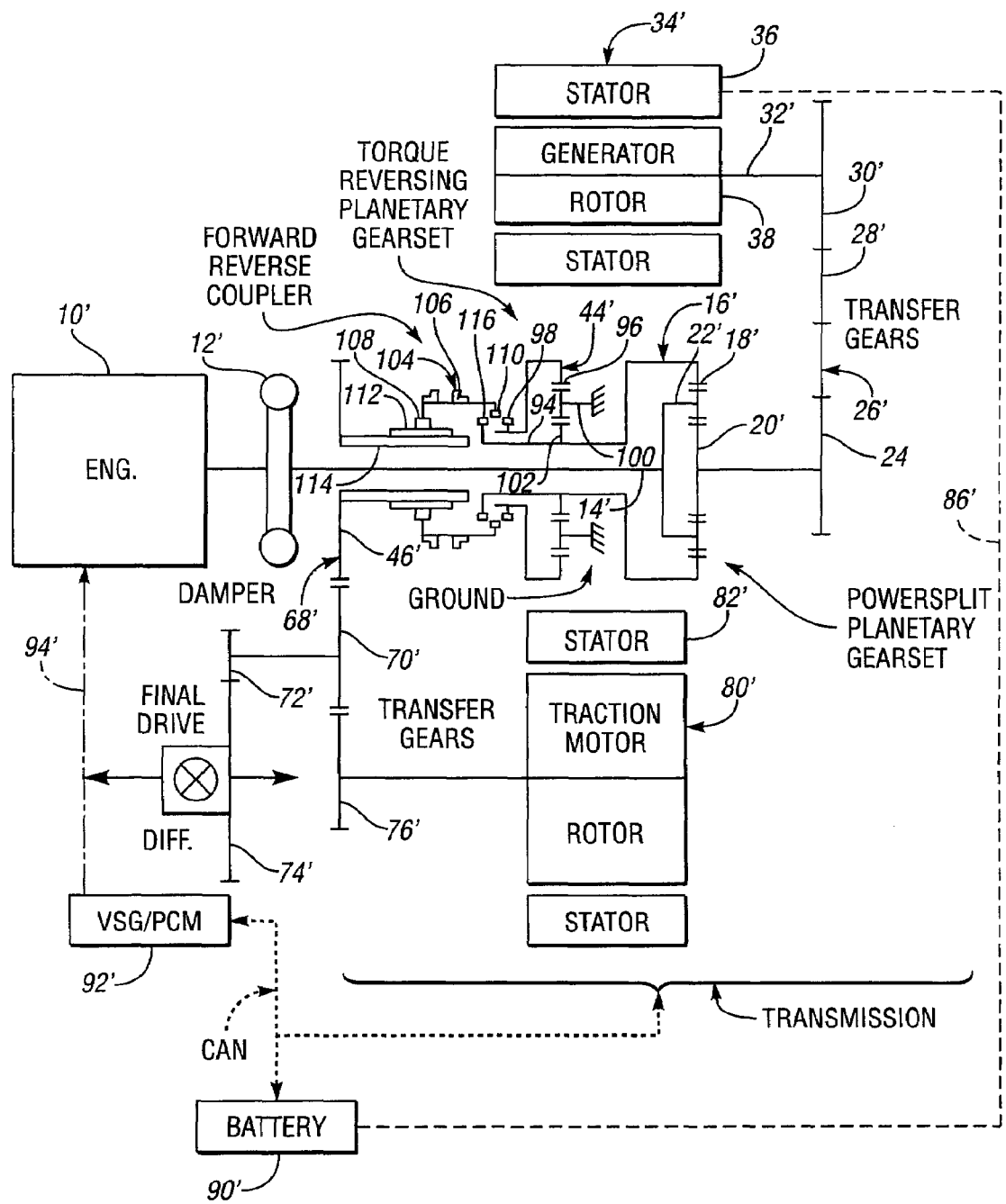
FIG. 2 is a schematic representation of a second embodiment of the invention wherein the forward and reverse coupler clutch is arranged to connect a torque output element of the power dividing gearing to separate elements of the torque reversing gearing, depending upon the operating state of the coupler clutch.

FIG. 2 shows an alternate embodiment of the invention. It has elements that correspond to elements of the embodiment of FIG. 1. The same reference numerals for these corresponding elements have been indicated in FIGS. 1 and 2, although prime notations are added to the numerals used in FIG. 2.

In the embodiment of FIG. 2, torque output from ring gear 18' of the power dividing planetary gearset 16' is delivered to sleeve shaft 94. Ring gear 96 of the torque reversing planetary gearset 44' is connected to coupler clutch teeth 98.

Carrier 100 of gearset 44' is anchored to the transmission housing as shown. Sun gear 102 of gearset 44' is connected to sleeve shaft 94.

Forward and reverse coupler clutch assembly 104 has a clutch element comprising a sliding sleeve with internal clutch teeth 108 and 110. Internal clutch teeth 108 slidably engage external clutch teeth 112 on sleeve shaft 114. Internal spline teeth 110 are shiftable into an out-of-engagement with external spline teeth 98 and with external spline teeth 116 formed on sleeve shaft 94.

When engine torque drives carrier 22', forward driving torque is delivered to sleeve shaft 94. If the forward and reverse coupler clutch sleeve 106 is shifted to the left, driving torque then is transferred to transfer gear 46', which drives the final drive gearing in a forward driving direction. That forward driving torque is augmented by traction motor torque delivered to transfer gear 76'. In this operating mode, the powertrain illustrated in FIG. 2 operates with the same forward drive function as the powertrain disclosed in the '053 patent and the '017 patent previously described.

During reverse drive, coupler clutch sleeve 106 is shifted in a right-hand direction. This directly connects clutch sleeve 106 and coupler teeth 98 so that torque is delivered directly from ring gear 96 to sleeve 114. Since the carrier 100 is anchored to the transmission housing, ring gear 96 and sleeve 114 are driven in a reverse direction. When the motor is conditioned by the vehicle system controller to operate in a reverse drive mode, reverse torque delivered to countershaft gear element 70' from the gearset 44' is combined with reverse drive motor torque delivered to countershaft gear element 70' from transfer gear 76'. Thus, enhanced reverse drive performance is achieved as torque from gearset 44 is added to the reverse driving torque made available by the traction motor 80'.

Figure 3:
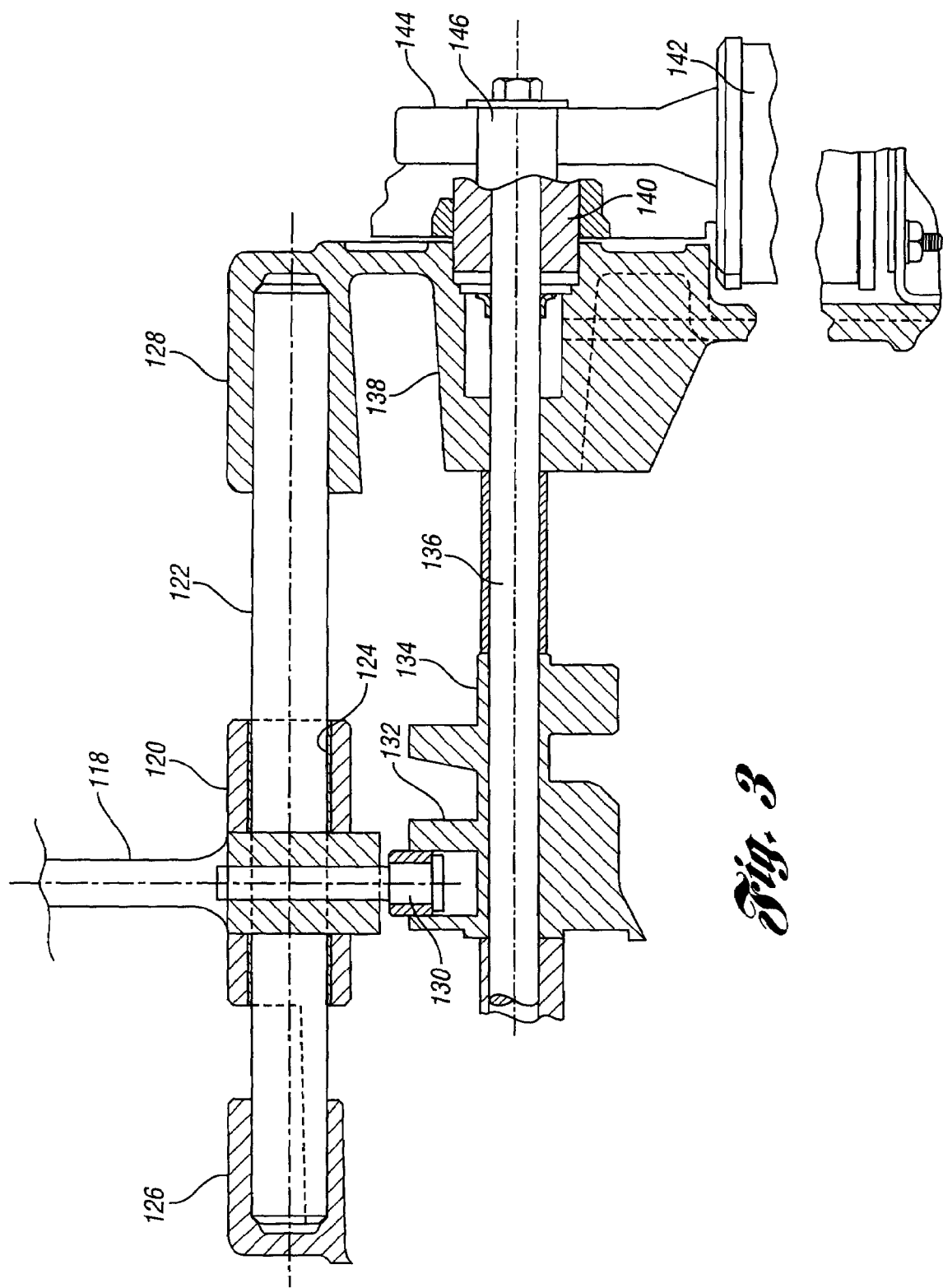
FIG. 3 is a partial cross-sectional view of an actuator assembly for selectively shifting the forward reverse coupler clutch to a reverse driving state and to a forward driving state.

FIG. 3 shows in schematic form a forward and reverse drive shifter for the forward and reverse coupler of FIG. 1 and for the forward and reverse coupler of FIG. 2. It comprises a shifter fork partially shown at 118. The shifter fork 118 has a hub 120, which is slidably mounted on support shaft 122 by a bushing 124. The ends of support shaft 122 are supported on transmission housing portions, as shown at 126 and 128.

The shifter fork hub carries a cam follower 130, which is received in a spiral groove 132 formed on a sleeve 134. The sleeve 134 is secured to a rotatable support shaft 136. The right-hand end of support shaft 136 is supported in an opening in a support sleeve on the transmission housing portion 128, as shown at 138. A suitable support bearing structure 140 may be provided for this purpose.

An electric reversible servo motor 142 is mounted on the transmission housing by a suitable attachment device (not shown). The servo motor has a worm gear mounted on and driven by a worm gear shaft, schematically illustrated at 144. The worm gear, driven by motor 142, drivably engages a worm pinion schematically shown at 146, which is connected drivably to shaft 136. Thus, when the motor 142 drives shaft 136, the spiral sleeve 134 will rotate, thereby causing the follower 130 on the fork hub 120 to shift in either a right-hand or left-hand direction, depending upon the direction of motion of the servo motor 142. In this way, the clutch sleeve 56 in the embodiment of FIG. 1 and the clutch sleeve 106 in the embodiment of FIG. 2 can be shifted in a right-hand direction or a left-hand direction in the direction of the axis of shaft 122.

Figure 4:
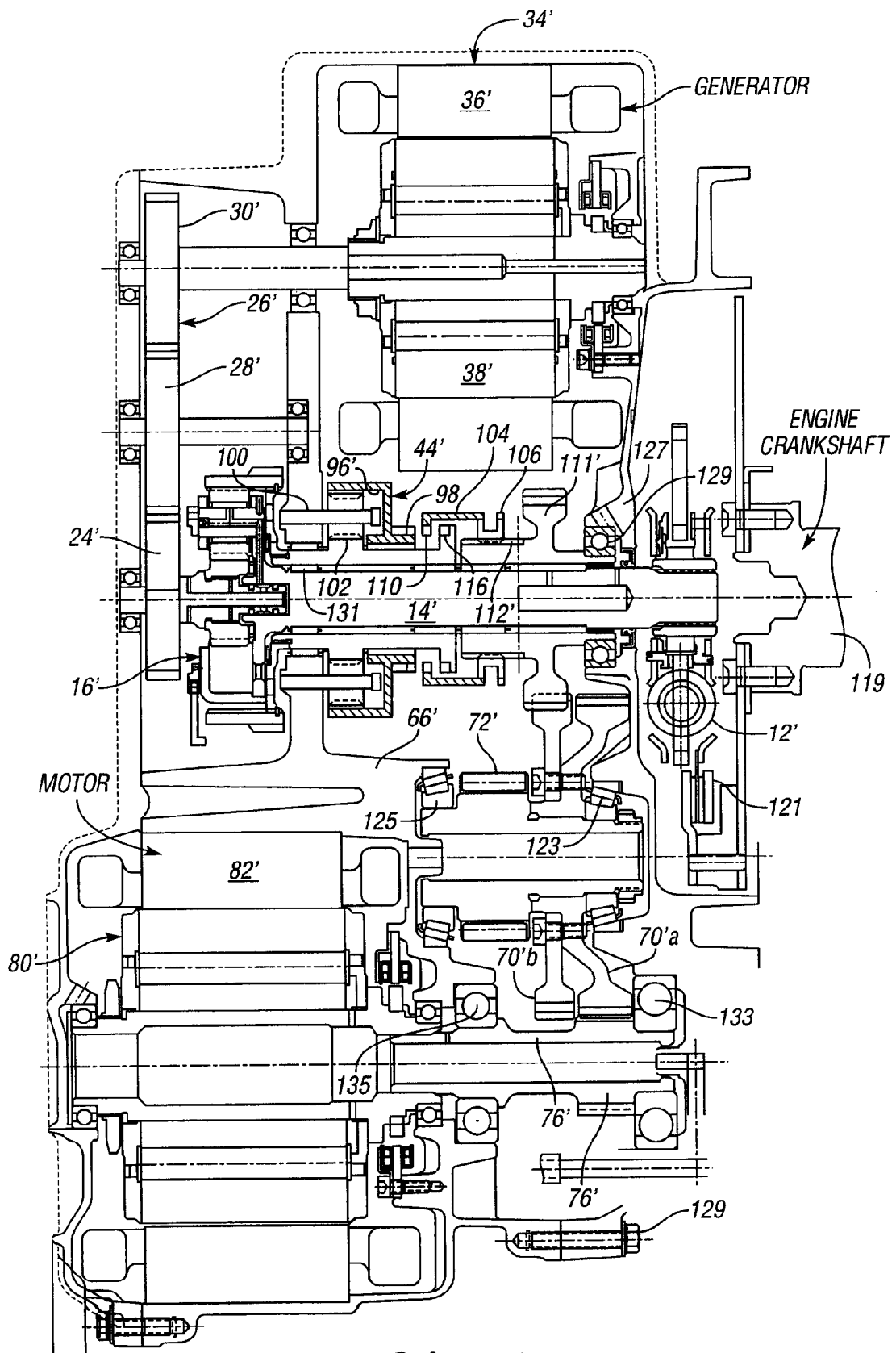
FIG. 4 is a partial cross-sectional view of the powertrain illustrated in FIG. 2, wherein the generator and the motor are packaged together with the torque reversing gearing and the forward and reverse coupler clutch in the powertrain to reduce the dimensions of the powertrain.

The embodiment of FIG. 2 is shown in more complete form in FIG. 4. The torque reversing planetary gearset and the forward and reverse coupler clutch are situated, as seen in FIG. 4, between the generator 34' and the motor 82' such that it does not require an increase in the axial dimension of the powertrain. Neither does it increase the dimensions of the powertrain in a direction transverse to the axial dimension. A hybrid electric vehicle powertrain installation that can accommodate the powertrain disclosed in the '053 patent or in the '017 patent, for example, can readily accommodate the powertrain of the present invention.

FIG. 4 illustrates an engine crankshaft at 119, which is not specifically illustrated in FIG. 2. Crankshaft 119 is directly coupled to a transmission torque limit clutch 121. If engine torque exceeds a calibrated limit value, clutch 121 will slip. Torque transmitted through the torque limit clutch 121 is distributed to the shaft 14' through the damper 12', as previously described.

In FIG. 4, the countershaft transfer gear elements corresponding to gear element 70' in FIG. 2 are tandem gears 70a' and 70b'. These tandem gears operate in the same fashion as the single gear 70' shown in FIG. 2.

The tandem gears 70a' and 70b' are end-supported by tapered thrust bearings 123 and 125 in housing portions 127 and 66', respectively. These two housing portions can be bolted together, as shown at 136, to form a unitary housing assembly.

Shaft 14' is end supported by bearing 129, and by bearing 131 in housing portion 66'. Bearing 131 is disposed between shaft 14' and a sleeve shaft 137 on which sun gear 102 and clutch teeth 116 are formed or otherwise carried. Sleeve shaft 137 is supported by bearing 139 in housing portion 66'. Sleeve shaft 137 is supported also by bearing 141. Bearing 143 supports transfer gear 46' on shaft 14'.

Sleeve shaft 111, driven by the motor 80', is end supported, as shown at 133 and 135 in housing portions 127 and 66', respectively. Transfer gear 76' is formed on or otherwise connected to sleeve shaft 111. The transfer gears 24', 28' and 30' for generator drive transfer gear assembly 26' are end supported in housing portion 66' as illustrated in FIG. 4.

Embodiments of the invention have been disclosed, but it will be apparent to persons skilled in the art that modifications may be made without departing from the scope of the invention. All such modifications and equivalents thereof are intended to be covered by the following claims.

What is claimed is:

1. A hybrid electric vehicle powertrain comprising an engine, an electric traction motor, an electric generator and a battery;
    a power-dividing gearset, a first element of the power-dividing gearset being connected drivably to the engine, and a second element of the power-dividing gearset being connected drivably to the generator;
    a torque-reversing gearset, a first element of the torque-reversing gearset being connected drivably to a third element of the power-dividing gearset;
    final drive transfer gears connected drivably to a second element of the torque reversing gearset and to the motor; and
    a forward-reverse coupler clutch assembly for selectively connecting together two elements of the torque-reversing gearset during forward drive and connecting a third element of the torque-reversing gearset to ground to provide a torque reaction during reverse drive.

2. The hybrid electric vehicle powertrain set forth in claim 1 wherein the power-dividing gearset is a planetary gear unit, the first element of the power-dividing gearset being a planetary carrier, the second element of the power-dividing gearset being a sun gear, and the third element of the power-dividing gearset being a ring gear.

3. The hybrid electric vehicle powertrain set forth in claim 1 wherein the torque-reversing gearset is a planetary gear unit, the first element of the torque-reversing gearset being a sun gear, the second element of the torque-reversing gearset being a ring gear, and the third element of the torque-reversing gearset being a planetary carrier.

4. The hybrid electric vehicle powertrain set forth in claim 3 wherein the sun gear of the torque-reversing gearset is connected drivably to the third element of the power-dividing gearset.

5. The hybrid electric vehicle powertrain set forth in claim 4 wherein the torque-reversing gearset and the power-dividing gearset are on a first axis that is common to an axis for the engine;
    the generator being on a second axis that is laterally spaced from and parallel to the first axis;
    the motor being on a third axis that is laterally spaced from and parallel to the first axis; and
    generator drive transfer gears connecting the generator to the third element of the power-dividing gearset;
    the final drive transfer gears connecting the ring gear of the torque reversing gearset to final drive gearing.

6. The hybrid electric vehicle powertrain set forth in claim 5 wherein the gearsets and the forward-reverse coupler clutch assembly are disposed on the common axis radially inward of the generator and the motor and spaced on the common axis between the generator drive transfer gears and the final drive transfer gears whereby the dimensions of the powertrain are reduced for packaging space efficiency.

7. The hybrid electric vehicle powertrain set forth in claim 1 wherein the forward-reverse coupler clutch assembly includes a clutch assembly actuator comprising a servo motor and a geared drive between the servo motor and the coupler clutch assembly.

8. A hybrid electric vehicle powertrain with forward and reverse drive modes comprising an engine, an electric traction motor, an electric generator and a battery;

a power-dividing gearset, a first element of the power-dividing gearset being connected drivably to the engine, and a second element of the power-dividing gearset being connected drivably to the generator;

a torque-reversing gearset, a first element of the torque-reversing gearset being connected drivably to a third element of the power-dividing gearset;

final drive transfer gears connected drivably to a second element of the torque-reversing gearset and to the motor; and a forward-reverse coupler clutch assembly for establishing a forward power flow path from the third element of the power-dividing gearset through the torque-reversing gearset during the powertrain forward drive mode and a reverse power flow path through the torque-reversing gearset during a powertrain reverse drive mode.

9. A hybrid electric vehicle powertrain comprising an engine, an electric traction motor, an electric generator and a battery;

a power-dividing gearset, a first element of the power-dividing gearset being connected drivably to the engine, and a second element of the power-dividing gearset being connected drivably to the generator;

a torque-reversing gearset, a first element of the torque-reversing gearset being connected drivably to a third element of the power-dividing gearset;

final drive transfer gears connected drivably to the motor; and a forward-reverse coupler clutch assembly for selectively connecting the third element of the power-dividing gearset to the final drive transfer gears during forward drive and for connecting a second element of the torque-reversing gearset to the final drive transfer gears during reverse drive;

a third element of the torque-reversing gearset being connected to ground to provide a torque reaction during reverse drive.

10. The hybrid electric vehicle powertrain set forth in claim 9 wherein the power-dividing gearset is a planetary gear unit, the first element of the power-dividing gearset being a planetary carrier, the second element of the power-dividing gearset being a sun gear, and the third element of the power-dividing gearset being a ring gear.

11. The hybrid electric vehicle powertrain set forth in claim 9 wherein the torque-reversing gearset is a planetary gear unit, the first element of the torque-reversing gearset being a sun gear, the second element of the torque-reversing gearset being a ring gear, and the third element of the torque-reversing gearset being a planetary carrier.

12. The hybrid electric vehicle powertrain set forth in claim 11 wherein the torque-reversing gearset and the power-dividing gearset are on a first axis that is common to an axis for the engine;

the generator being on a second axis that is laterally spaced from and parallel to the first axis;

the motor being on a third axis that is laterally spaced from and parallel to the first axis; and generator drive transfer gears connecting the generator to the third element of the power-dividing gearset;

the final drive transfer gears connecting the ring gear of the torque reversing gearset to final drive gearing.

13. The hybrid electric vehicle powertrain set forth in claim 12 wherein the gearsets and the forward-reverse coupler clutch assembly are disposed on the common axis radially inward of the generator and the motor and spaced on the common axis between the generator drive transfer gears and the final drive transfer gears whereby the dimensions of the powertrain are reduced for packaging space efficiency.

14. The hybrid electric vehicle powertrain set forth in claim 9 wherein the forward-reverse coupler clutch assembly includes a clutch assembly actuator comprising a servo motor and a geared drive between the servo motor and the coupler clutch assembly.

* * * * *